(12) United States Patent
Park

(10) Patent No.: US 6,628,594 B1
(45) Date of Patent: Sep. 30, 2003

(54) DEVICE AND METHOD FOR GENERATING WRITING SIGNAL FOR OPTICAL RECORDING MEDIUM BY CONTROLLING WRITING POWER LEVELS FOR DIFFERENT PIT PORTIONS

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/518,100

(22) Filed: Mar. 3, 2000

(30) Foreign Application Priority Data

Mar. 5, 1999 (KR) .......................................... 1999-7346

(51) Int. Cl.$^7$ ................................................ G11B 5/09
(52) U.S. Cl. ................................ 369/59.11; 369/59.12; 369/116
(58) Field of Search ............................ 369/59.11, 59.12

(56) References Cited

U.S. PATENT DOCUMENTS

| | | | | |
|---|---|---|---|---|
| 3,879,687 A | * | 4/1975 | Daehlin et al. | ............. 332/7.51 |
| 4,998,237 A | * | 3/1991 | Osakabe et al. | ............. 369/116 |
| 5,134,624 A | * | 7/1992 | Ono | ............. 372/32 |
| 5,327,411 A | * | 7/1994 | Iwasa et al. | ............. 369/116 |
| 5,502,702 A | * | 3/1996 | Nakajo | ............. 369/116 |
| 5,625,614 A | * | 4/1997 | Taniguchi | ............. 369/116 |
| 6,038,241 A | * | 3/2000 | von Elm et al. | ............. 372/30 |
| 6,181,659 B1 | * | 1/2001 | Kobayashi | ............. 369/59.11 |
| 6,333,905 B2 | * | 12/2001 | Kobayashi et al. | ............. 369/59.11 |
| 6,381,054 B1 | * | 4/2002 | Okayasu et al. | ............. 359/154 |

FOREIGN PATENT DOCUMENTS

| | | | |
|---|---|---|---|
| JP | 64-078437 A | | 3/1989 |
| JP | 04-049526 | * | 2/1992 |
| JP | 06-020278 A | | 1/1994 |

OTHER PUBLICATIONS

Abstract of JP 64–078437.
Abstract of JP 06–020278.

* cited by examiner

Primary Examiner—Aristotelis M. Psitos
(74) Attorney, Agent, or Firm—Birch, Stewart, Kolasch & Birch, LLP

(57) ABSTRACT

Device and method for generating an optimal writing signal for an optical recording medium, the method having the steps of providing a writing pulse according to a data to be written, and applying a writing power level with reference to the writing pulse to a laser diode to drive the laser diode for forming a pit, the method including the steps of (1) confirming a length of a prior blank and a length of the present pit from the writing pulse, (2) providing a writing power compensating signal such that a writing power level of a starting portion of the pit is determined with reference to the length of the prior blank confirmed in the step (1), and a writing power level of the end portion of the pit is determined with reference to the length of the present pit, and (3) adding the provided writing power compensating signal to the writing power level.

21 Claims, 9 Drawing Sheets

$$\begin{cases} dPblk \varpropto f(\text{blank length}) \\ dPpit \varpropto f(\text{pit length}) \end{cases}$$

DEVICE AND METHOD FOR GENERATING WRITING SIGNAL FOR OPTICAL RECORDING MEDIUM BY CONTROLLING WRITING POWER LEVELS FOR DIFFERENT PIT PORTIONS

BACKGROUND OF THE INVENTION

1. Field of the Invention

The present invention relates to a data recording/reproducing system for an optical recording medium, and more particularly, to a device and method for generating an optimal writing signal for an optical recording medium.

2. Background of the Related Art

In general, an optical medium, such as a re-writable optical disk, is formed of a phase change material. A beam focused from an optical head is converted into heat, and the heat changes a state of the phase change material, which changes a reflection of the phase change material, that forms a mark on the phase change disk, to record a pit. The formation of a fixed length of mark on the disk is called as write strategy. In this instance, the laser beam is incident on an opposite side of a reflection surface where the pits are formed. The pits are projections if they are seen from the laser incident side. The pit has a width of 0.4~0.6 μm, and a length of the pit and a distance between the pits has 9 steps from 3T to 11T in the case of a compact disk(CD), and 12 steps from 3T to 14T in the case of digital versatile disk (DVD). The 'T' is a length of one clock pulse, with 3T meant three clock pulses, and 11T meant a length corresponding to 11 clock pulses. In groups of pits in a spiral track, there are particular array of pits at fixed intervals, one of which is a synchronizing signal, and a block between adjacent synchronizing signals is called a frame which consists of a plurality of symbol data.

FIG. 1 illustrates a block diagram showing a system related to recording in a related art optical disk recording/reproducing device, including an encoder 103 which processes the steps for receiving a signal for recording on a disk 101, converting the signal into 16 bit digital signal, and splitting the signal into forward 8 bits and a backward 8 bits (this is called as a symbol) in frame units, and conducts an EFM (Eight to Fourteen Modulation) in which a data of symbol 8 bits are converted into 14 bit data by taking a 14 bit code value from a code table in a memory (not shown). That is, the memory has the code table for conducting an EFM or EFM+ mapped thereon. The data having EFM or EFM+ modulated is added with margin bits (for example, three bits), and subjected to modulation of NRZI (Non-Return-to Zero, Inverted) type as shown in FIG. 2A. The NRZI modulation is a modulation rule in which a data is inverted a signal of '1'. That is, once '1' is met, the present state is inverted. In the meantime, a writing power generator 104 generates a power of an LD (Laser Diode) for a data to be written, converts it into an analog signal, and provides to an LD driver 106 through a writing level adder 105. The writing power is varied with a length of mark to be formed and a state of the disk.

Upon reception of the NRZI modulated data from the encoder 103, the LD driver 106 modulates the LD power into a writing power, i.e., converts an LD driving voltage into an LD driving current, and drives the LD of an optical pickup 102, to write the NRZI modulated signal on the optical disk 101. The LD beam power varies with temperature significantly; the writing power drops the more, as the temperature rises the higher, and vice versa. In order to solve this problem, a portion of the LD power is fed back to an ALPC (Auto Laser Power Control) feed-back 107. The ALPC feed-back 107 provides a ± power level to the writing level adder 105 according to a fed-back LD power, and adds to the writing power generated at the writing power generator 104, for maintaining the LD power at a fixed level during writing/reproduction.

When a data is written by means of an NRZI modulated single pulse, the pit is formed like a tear drop due to a thermal property of the disk itself, or formation of the mark is distorted due to a latent heat property of the disk. That is, a fore end of a mark being written at the present time is affected by a latent heat generated for forming a mark written just before, to change a length of the mark, and to change an end length of the mark written at the present time according to a length of the mark written at the present time. Accordingly, a multi-pulse modulation is used at times for preventing dispersion of the heat and forming a smooth oval form of a pit, in which, as shown in FIG. 2B, one pulse is divided into many pulses by turning on/off many times within one NRZI modulated pulse before directing to the disk. The direction of many divided pulses to the disk can prevent accumulation of heat in a section of a signal pit, to form the smooth oval form of pit. Alikely, upon reception of a multi-pulse modulated signal from the encoder 103, the LD driver 106 converts an LD driving voltage into an LD driving current before driving the LD, the multi-pulse modulated signal is written on the optical disk 101.

As shown in FIG. 2B, an order of strength of the LD power is at writing, which is the strongest, at erasure, and at reading. However, since widths and intervals of the multi-pulses are fixed, the problems caused by the heat dispersion or accumulation according to lengths of pits formed as marks, and lengths of blanks where no data is written thereon can not be solve completely. This implies that, despite the pit should have a form like one shown in FIG. 2E, actual one is not so. That is, lengths of prior marks and blanks vary widely, and a ratio of the heat dispersion varies with the lengths of marks and the blanks, which affects the formation of a pit of the next mark that is exhibited as a jitter in a reproduction signal. Particularly, an overwritten pit becomes either greater or smaller than a desired pit, which acts as a main cause of jitter in reproducing a data from the disk, and makes an accurate data recovery difficult. In order to solve this problem in a related art, the writing pulse is mainly adjusted with respect to a time axis in writing the data. One of which methods is the pulse edge shift as shown in FIG. 2C, and the other method is the pulse position shift as shown in FIG. 2D. That is, as shown in FIG. 2C, in the edge shift, a desired mark is formed by adjusting an edge of a writing pulse of the present mark with respect to a time axis according to lengths of a prior mark, prior blank and the present mark being formed, and, as shown in FIG. 2D, in the pulse position shift, a desired mark is formed by adjusting a width of a writing pulse with respect to the time axis according to the lengths of the prior mark and the prior blank, and the length of the present mark being formed.

However, the method for adjusting a width of a writing pulse with respect to the time axis is difficult to control as it goes to high speed/high density, with a high frequency noise exhibited. For example, a fine pulse width adjustment in a range of approx. 1 ns is required for a DVD-RAM(for example, of 4.7 GB), which is difficult to control as functions of the length of a pit to be written and a length of a blank forward of the pit to be written and the like, and, even if the adjustment is made, it is difficult to form a desired mark. And, this can not be followed after by a device for implementing this with easy. That is, as it goes to high speed/high density, a time basis control of the writing pulse becomes difficult.

SUMMARY OF THE INVENTION

Accordingly, the present invention is directed to a device and method for generating an optimal writing signal for an optical recording medium that substantially obviates one or more of the problems due to limitations and disadvantages of the related art.

An object of the present invention is to provide a device and method for generating an optimal writing signal for an optical recording medium, which is easy to control and permits to form an accurate pit.

Another object of the present invention is to provide a device and method for generating an optimal writing signal for an optical recording medium, which permits an optimal writing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for generating a writing signal for an optical recording medium according to an embodiment of the present invention, includes the steps of (1) confirming a length of a prior blank and a length of the present pit from the writing pulse, (2) providing a writing power compensating signal such that a writing power level of a starting portion of the pit is determined with reference to the length of the prior blank confirmed in the step (1), and a writing power level of the end portion of the pit is determined with reference to the length of the present pit, and (3) adding the provided writing power compensating signal to the writing power level.

The step (2) includes the steps of inverting the writing pulse, and integrating the inverted signal.

The step (2) includes the step of bringing an initial power for a blank portion of the integrated signal to a reference level by using a reset pulse.

The step (2) includes the step of subjecting the integrated signal to a non-linear transformation.

The step (2) includes the steps of charging within a blank section of the writing pulse, and discharging within a pit section, for providing the writing power compensating signal.

The step (2) includes the steps of bringing an initial level of the blank portion to the reference level by charging from the reference level.

In other aspect of the present invention, there is provided a device for writing/reproducing to/from an optical recording medium according to an embodiment of the present invention, including an encoder for generating the writing pulse according to a data to be written, a writing power compensating signal generator for providing a writing power compensating signal such that a writing power level of a starting portion of the pit is determined with reference to the length of the prior blank confirmed from the writing pulse, and a writing power level of the end portion of the pit is determined with reference to the length of the present pit, and an adder for adding the provided writing power compensating signal to the writing power level.

The writing power compensating signal generator includes an integrator for generating the writing power compensating signal by inverting the writing pulse, integrating the inverted signal.

The integrator brings an initial power of the blank portion of the integrated signal to the reference level by the reset pulse.

The writing power compensating signal generator includes a charger/discharger for generating the writing power compensating signal by charging within a blank section of the writing pulse and discharging within a pit section of the writing pulse.

The writing power compensating signal generator subjects the writing power compensating signal to non-linear transformation, and forwards to the adder.

The encoder generates a single pulse as the writing pulse for a one pit length.

The encoder generates multi-pulse as the writing pulse for one pit length.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. The present invention suggests to establish a fixed write strategy within an adjustable range of a writing pulse regardless a length of blank before a mark to be written or a pit length to be written, and to adjust a fine width of a pit length by adjusting an LD beam power, i.e., LD driving voltage level, for conducting an optimal writing. Particularly, the present invention suggests to adjust a writing power level of a pit starting portion according to a prior blank length, and to adjust a writing power level of a pit end portion according to the present pit length, for adjusting a width of a length of a pit in a mark, to differ writing power levels for a pit starting portion and a pit end portion.

Figure 1:
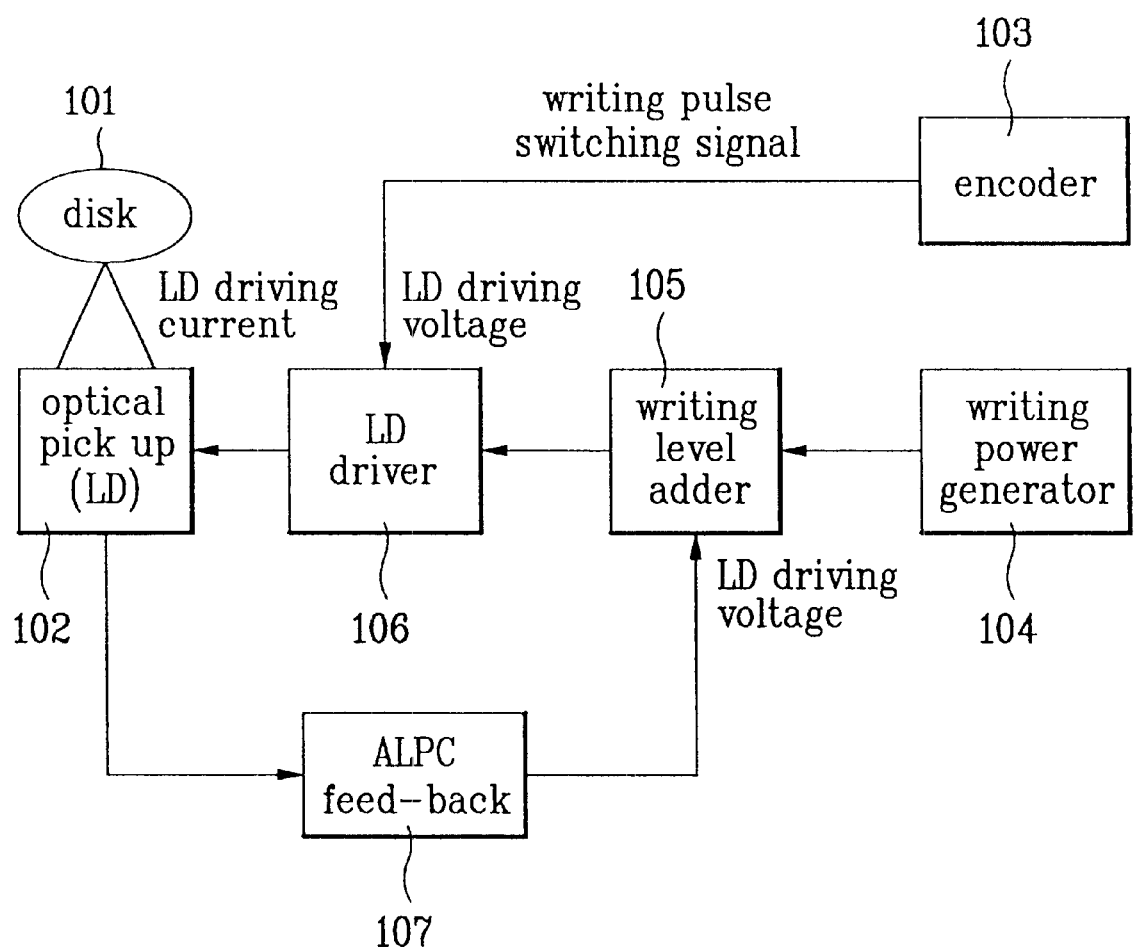
FIG. 1 illustrates a block diagram of a related art optical disk recording/reproducing device.
Figure 3:
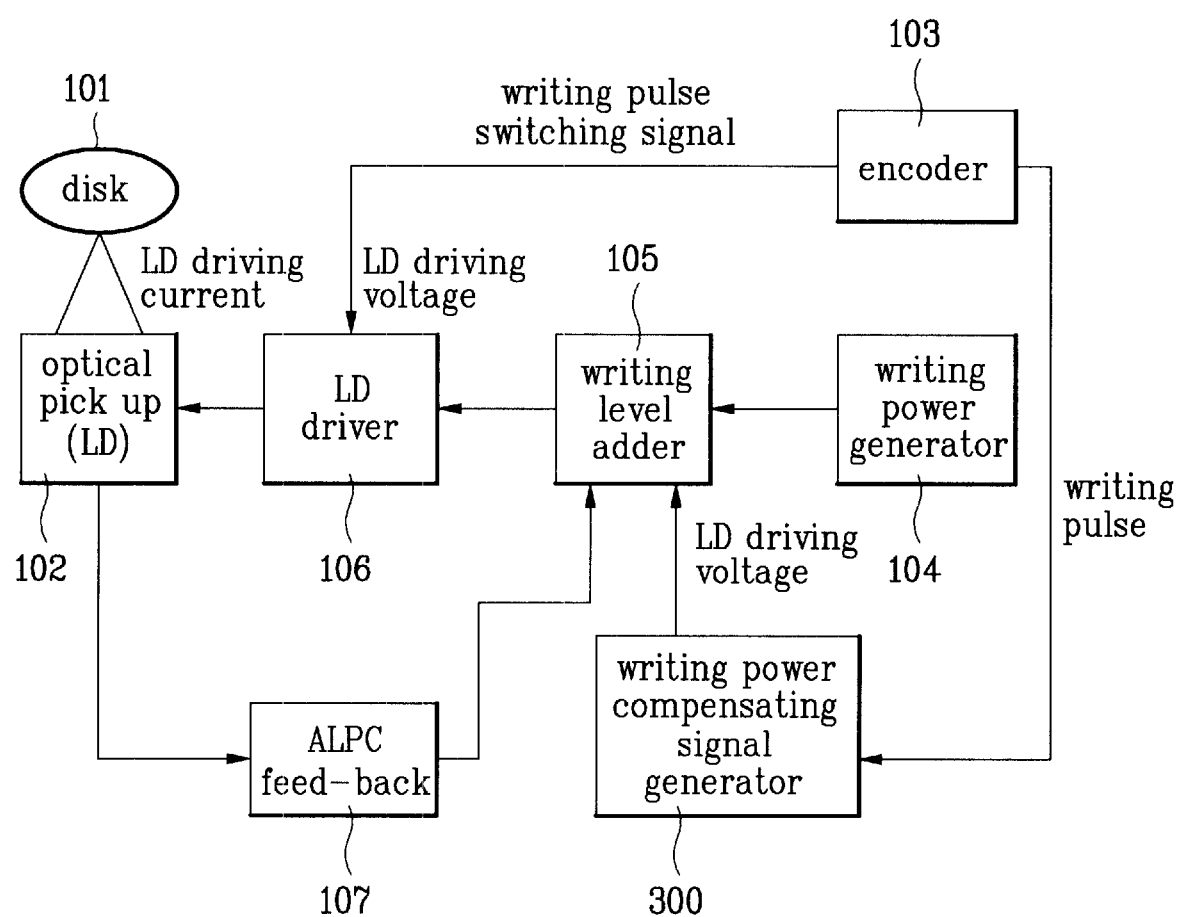
FIG. 3 illustrates a block diagram of an optical disk recording/reproducing device in accordance with a preferred embodiment of the present invention.

FIG. 3 illustrates a block diagram of blocks related to writing in an optical disk recording and reproducing device of the present invention, which has a writing power compensating signal generator 300, in addition to the elements of FIG. 1. The writing power compensating signal generator 300 uses a functional relation between pits and blanks in controlling a writing power level, for making an optimal data writing. That is, in formation of a pit, the writing power compensating signal generator 300 generates a writing power compensating signal such that an initial pit writing power level is determined as a function of a prior blank length, and an pit end portion writing power level is determined as a function of the present pit length. The prior blank length and the prior pit length can be known from the writing pulse from the encoder 103.

Figure 4:
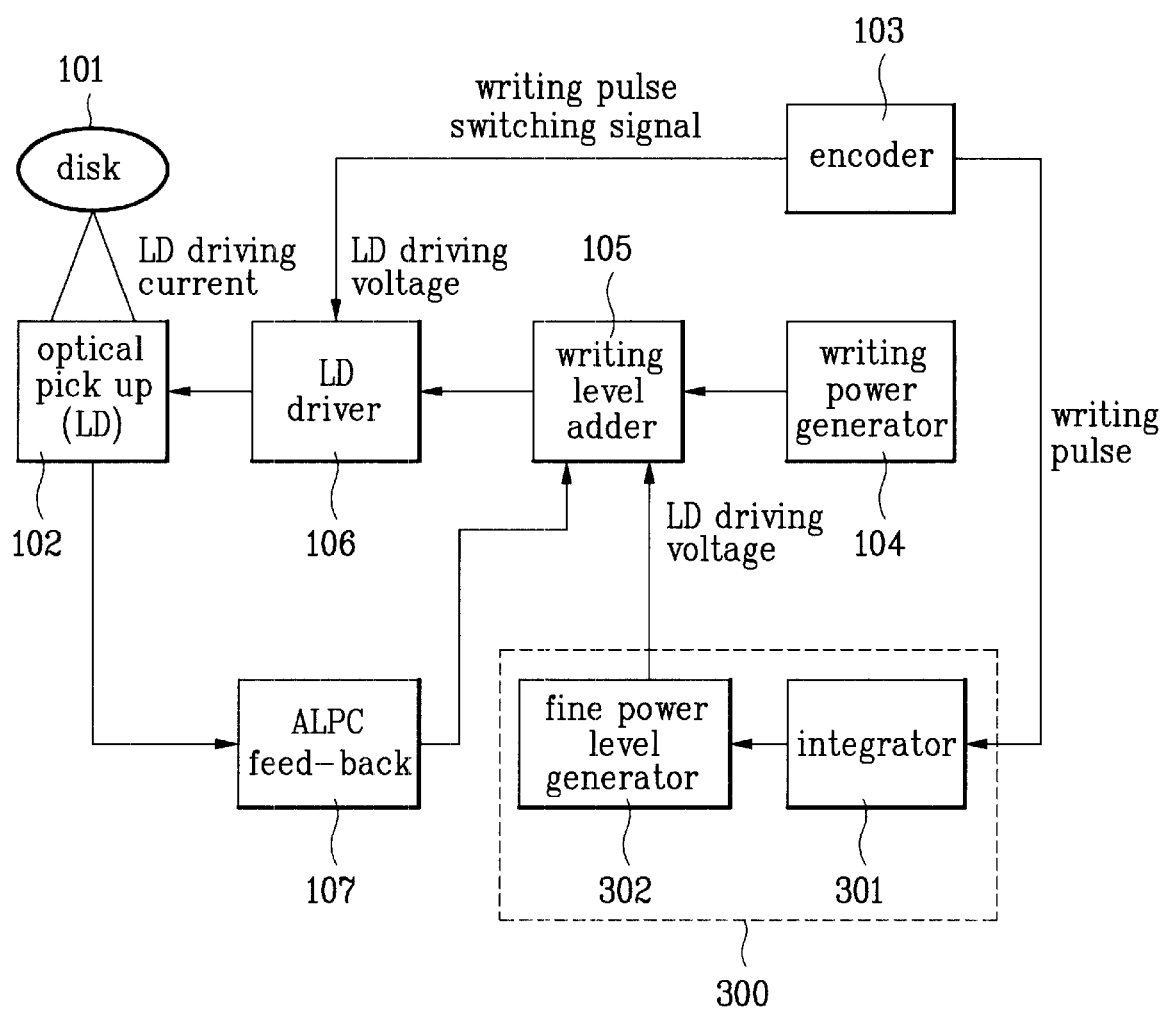
FIG. 4 illustrates a block diagram of one preferred embodiment of the writing power compensating signal generator in FIG. 3.
Figure 6:
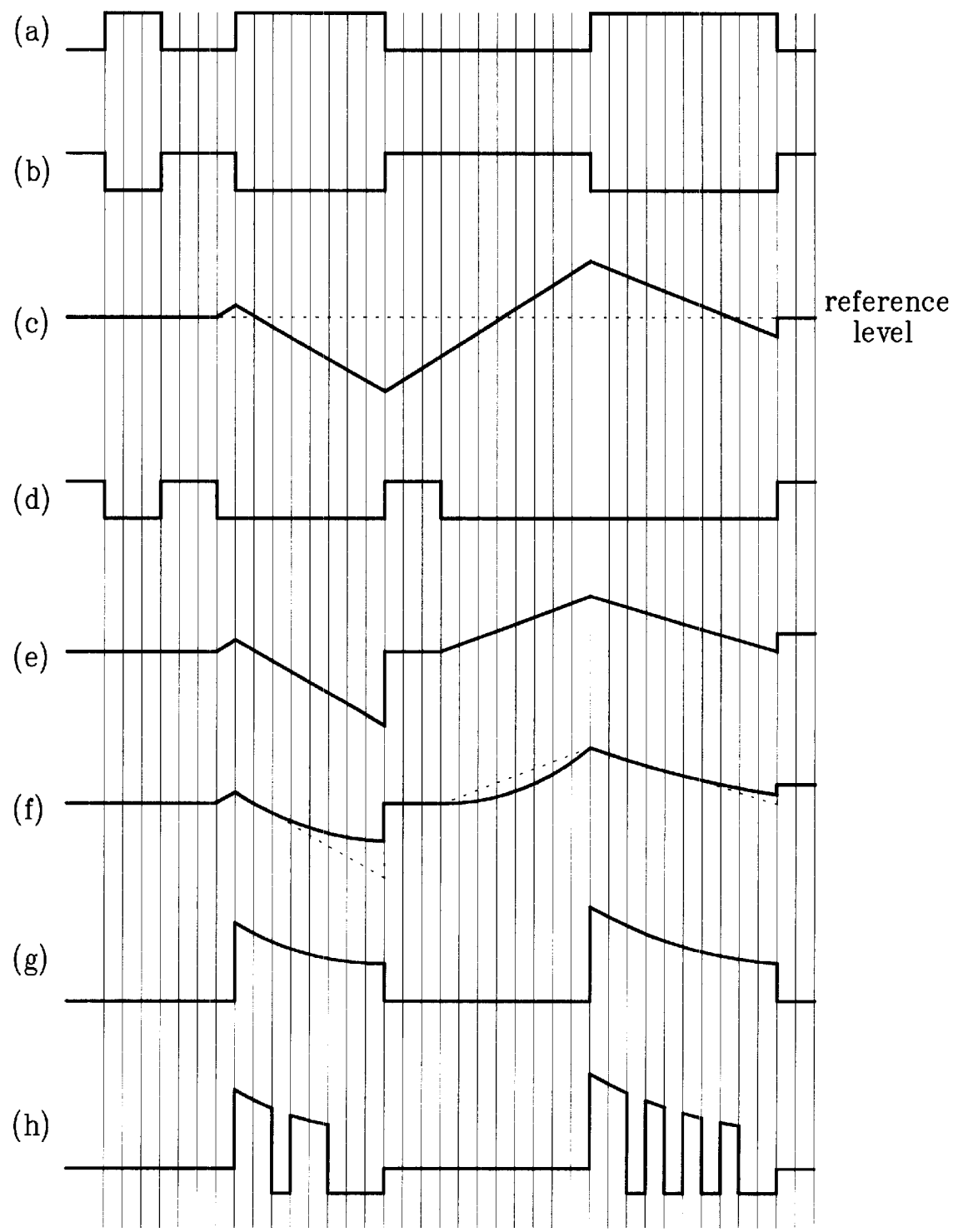
FIGS. 6A~6H illustrate operation timing diagrams of various units in FIG. 4 according to one embodiment of the present invention.

FIG. 4 illustrates a detailed block diagram of one preferred embodiment of the writing power compensating signal generator 300 in FIG. 3 including an integrator 301 for receiving, and integrating writing pulses from the encoder 103, and a fine power level generator 302 for making a linear transformation of the integrated signal and forwarding it to the writing level adder 105. In this embodiment of the present invention having the aforementioned system, when the encoder 103 provides a writing pulse as shown in FIG. 6A, the integrator 301 in the writing power compensating signal generator 300 inverts the writing pulse from the encoder 103 as shown in FIG. 6B before integration, to generate an integrated pulse having a linear slope as shown in FIG. 6C. The writing pulse may be a single pulse or multi-pulse.

Figure 5:
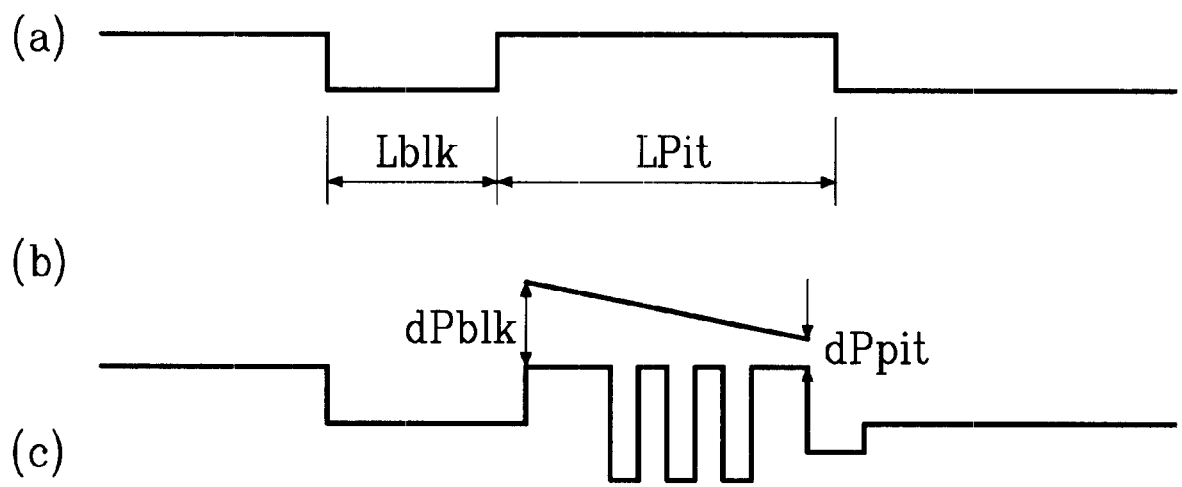
FIGS. 5A~5C illustrate operation timing diagrams of the integrator in FIG. 3 according to one embodiment of the present invention.

FIGS. 5A~5C illustrate detailed integration operations of the integrator 301 in FIG. 3, wherefrom it can be known that, if an NRZI modulated signal is one as shown in FIG. 5A, and multi-pulse of this case is one as shown in FIG. 5C, an output of the integrator 301 is reduced linearly at a pit portion having a mark formed thereon. In FIGS. 5A~5C, Lblk is a blank length, and Lpit is a pit length, and it can be known that dPblk is proportional to a blank length, and dPpit is proportional to a pit length. In order to form, and finish the formation of a pit quickly, the integrator 301 integrates the inverted writing pulses. That is, if the writing pulses are inverted before integration, a slope of the integrated signal will be opposite to the one shown in FIG. 5. For example, it can be known from FIG. 6C that the integration of the inverted writing pulses causes an end portion of the pit to go down below a reference level, that provides an effect identical to the related art pulse edge shift. That is, as heat is accumulated in the pit, if the power dropped below the reference level is provided to the writing level adder 105, the LD driving voltage can be dropped as much, accelerating formation of the pit. In this instance, an integrated value may be forwarded to the writing level adder 105 as it is, or a level of an initial power for a blank portion may be brought to the reference level as shown in FIG. 6E by means of reset pulses as shown in FIG. 6D, before it is forwarded to the writing level adder 105, for bringing the level of the writing power to the reference level at a starting of the blank, for preventing a great influence from a boosted or dropped writing power to formation of a pit when the pit size is small. The reset pulse may be generated at the encoder 103, with a size, for example, 3T.

In the meantime, since a recording medium has a non-linear property, the fine power level generator 302 subjects an output of the integrator 301 to non-linear fine adjustment as shown in FIG. 6F to be consistent to a physical property of the recording medium before forwarding it to the writing level adder 105. The writing level adder 105 sums the writing power, i.e., an LD driving voltage, generated at the writing power generator 104, a feed back voltage from the ALPC feed back 107, and the voltage generated at the fine power level generator 302, and forwards the sum to the LD driver 106. In this instance, it can be known that the writing power level at a pit starting portion becomes different from the writing power level at a pit end portion by the writing power compensating signal generator 300. As shown in FIG. 6G or 6H, the LD driver 106 drives the LD by receiving and converting an LD driving voltage into an LD driving current, for writing the writing pulse from the encoder 103 on the optical disk 101.

Figure 7:
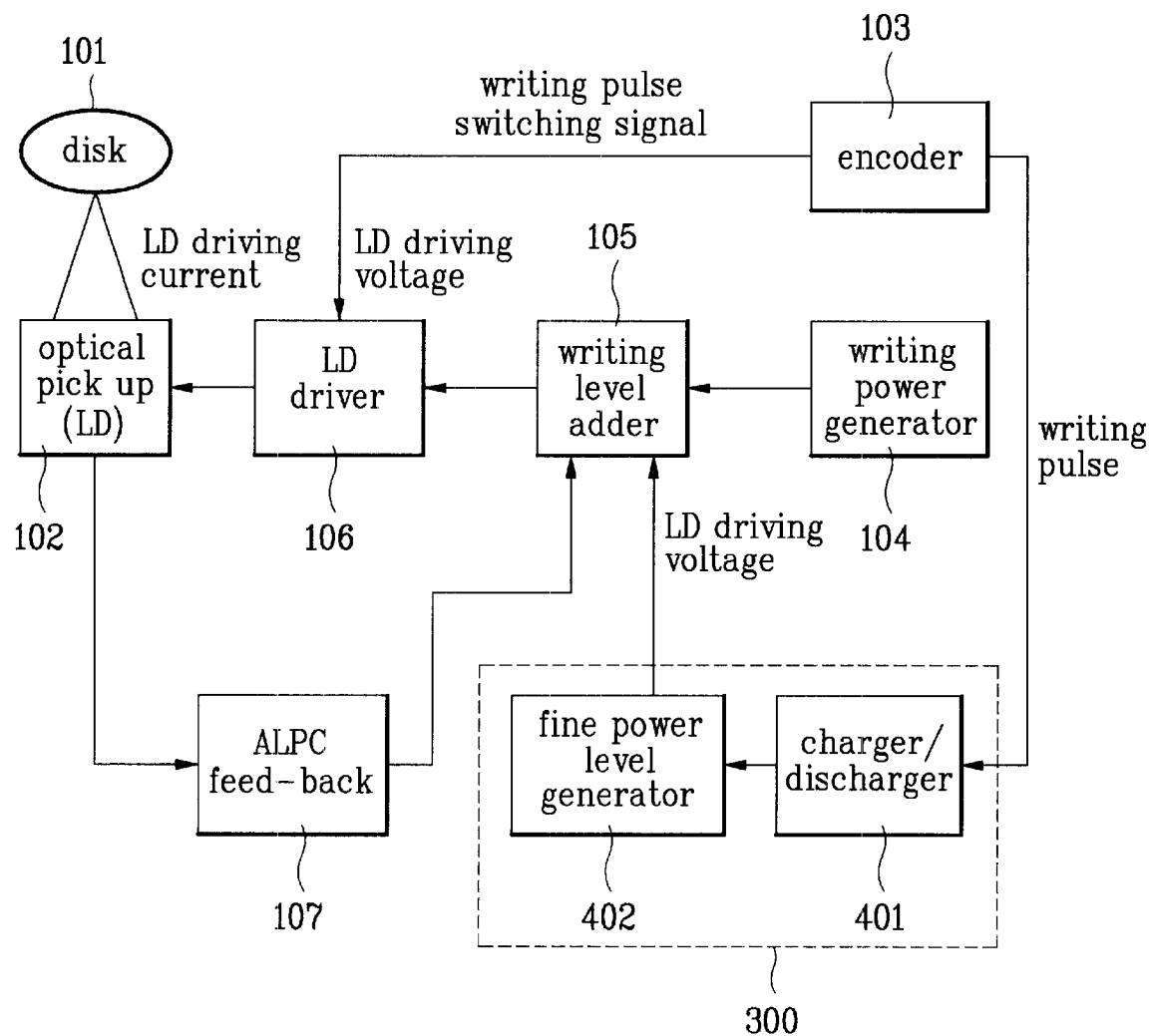
FIG. 7 illustrates a block diagram of another preferred embodiment of the writing power compensating signal generator in FIG. 3.

In the meantime, FIG. 7 illustrates a block diagram of another preferred embodiment of the writing power compensating signal generator 300 in FIG. 3 including a charger/discharger 301 for charging/discharging in response to the writing pulse received from the encoder 103, and a fine power level generator 402 for making a non-linear transformation of the charged/discharged signal, and forwarding the output of the generator 402 to the writing level adder 106. That is, the another preferred embodiment of the present invention provides different writing power levels at the starting portion and the end portion of the pit by charging/discharging the writing pulses from the encoder 103.

Figure 8:
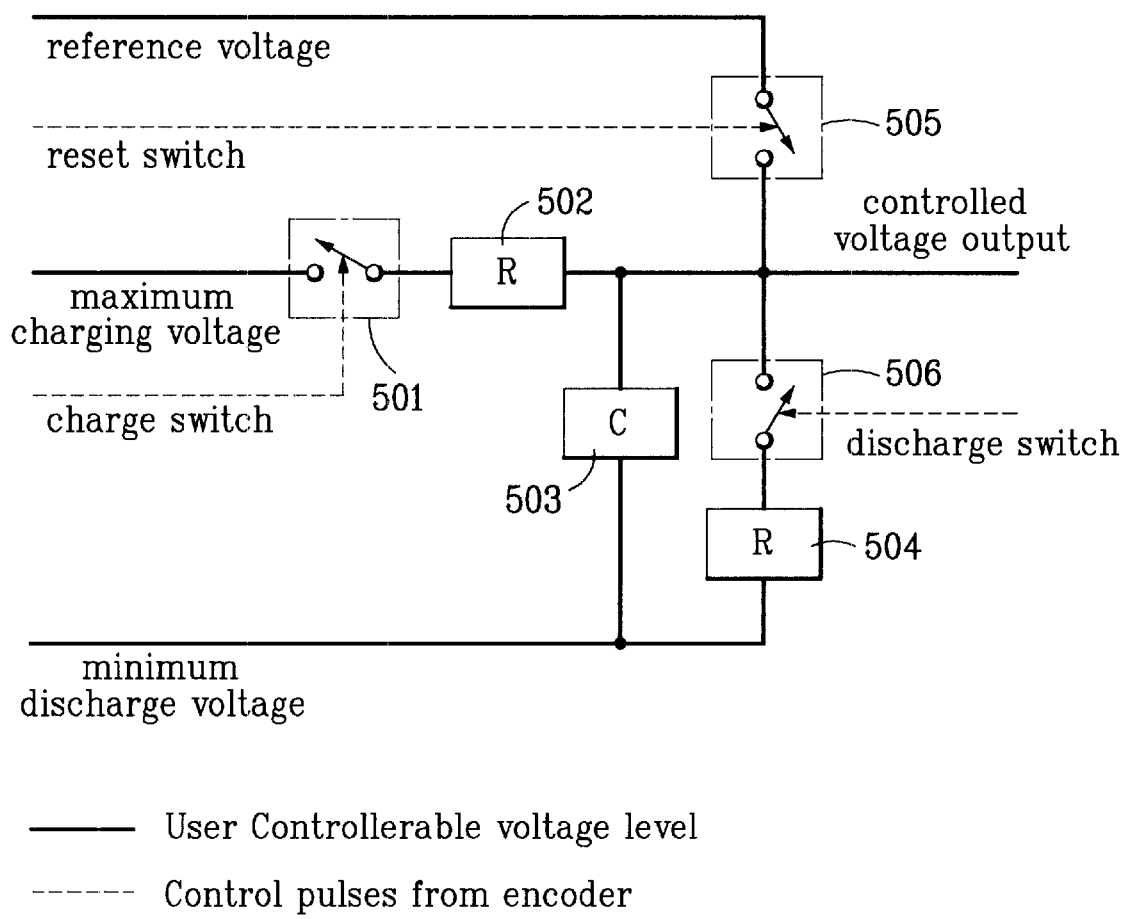
FIG. 8 illustrates a detailed block diagram of the charger/discharger in FIG. 7; and, FIGS. 9A~9G illustrate operation timing diagrams of various units in FIG. 8 according to one embodiment of the present invention.
Figure 9:
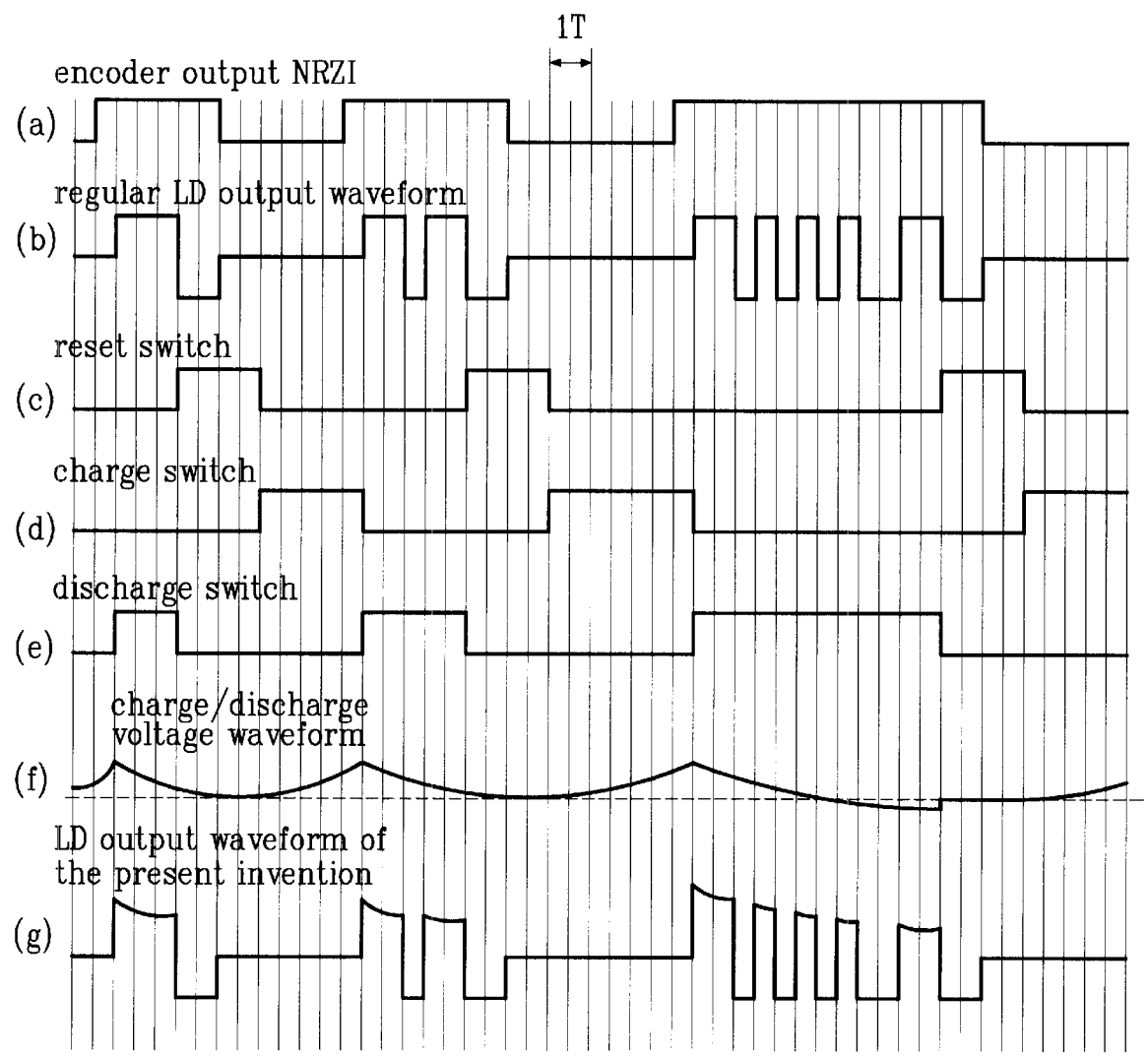

FIG. 8 illustrates a detailed block diagram of one embodiment of the charger/discharger 401 in FIG. 7, including RC time constants 502, 503, and 504. The encoder 103 provides a reset switch pulse, a charge switch pulse, a discharge switch pulse as shown in FIGS. 9C, 9D, and 9E, to a reset switch, a charge switch, and a discharge switch 505, 501, and 506 on the charger/discharger, respectively, for controlling the switching. That is, the reset switch pulse is turned on at a starting portion of the blank, the charge switch pulse is turned on in a blank section, a period of which turn on is proportional to the pit length. In FIG. 8, a reference voltage, a maximum charge voltage, and a minimum discharge voltage are adjustable by a user. In this instance, the charge switch 501 is turned on by the reset switch pulse, the charge switch pulse, and the discharge switch pulse as shown in FIGS. 9C, 9D, and 9E, and, if the reset switch 505 and the discharge switch 506 are turned off, the maximum charge voltage is charged to the capacitance 503 through the resistor 502. In this instance, a time period and a voltage for charging a capacitance 503 is proportional to the blank length.

If the charge switch is turned off and the discharge switch 506 is turned on, i.e., at a time point writing is started, the voltage charged to the capacitance 503 is discharged through a resistor 504. In this instance, a time period and a voltage required for discharging the capacitance 503 is proportional to the pit length being formed. In this instance, the charged/discharged voltage may be forwarded to the writing level adder 105 as it is, or brought an initial power for a blank portion to the reference level before the charged/discharged voltage is forwarded to the writing level adder 105 for always starting charging from the reference level by a reset switch pulse as shown in FIG. 9C, for preventing a great influence from a boosted or dropped writing power to formation of a pit when the pit size is small. That is, if the writing pulse is turned off, i.e., if the discharge switch 506 is turned off, and the reset switch 505 is turned on as shown in FIGS. 9C and 9E, as the discharge ends, the capacitor 503 is charged with the reference voltage. Accordingly, as shown in FIGS. 9C and 9D, if the charge switch is turned on as the reset switch 505 is turned off, the capacitor 503 always is charged with a voltage starting from the reference level. FIG. 9F illustrates a charge/discharge voltage waveform from the charger/discharger 401 formed by the reset switch pulse, the charge switch pulse, and the discharge switch pulse as shown in FIGS. 9C, 9D, and 9E, wherefrom it can be known that the charging is always started from the reference level. The initial power at the blank portion is at the reference level. Herein, if a discharge level is at the reference level, the reset switch can be dispensed with. In the meantime, since a recording medium has a non-linear property, the fine power level generator 402 subjects an output of the charger/discharger 401 to non-linear fine adjustment to be consistent to a physical property of the recording medium before forwarding to the writing level adder 105.

Figure 2:
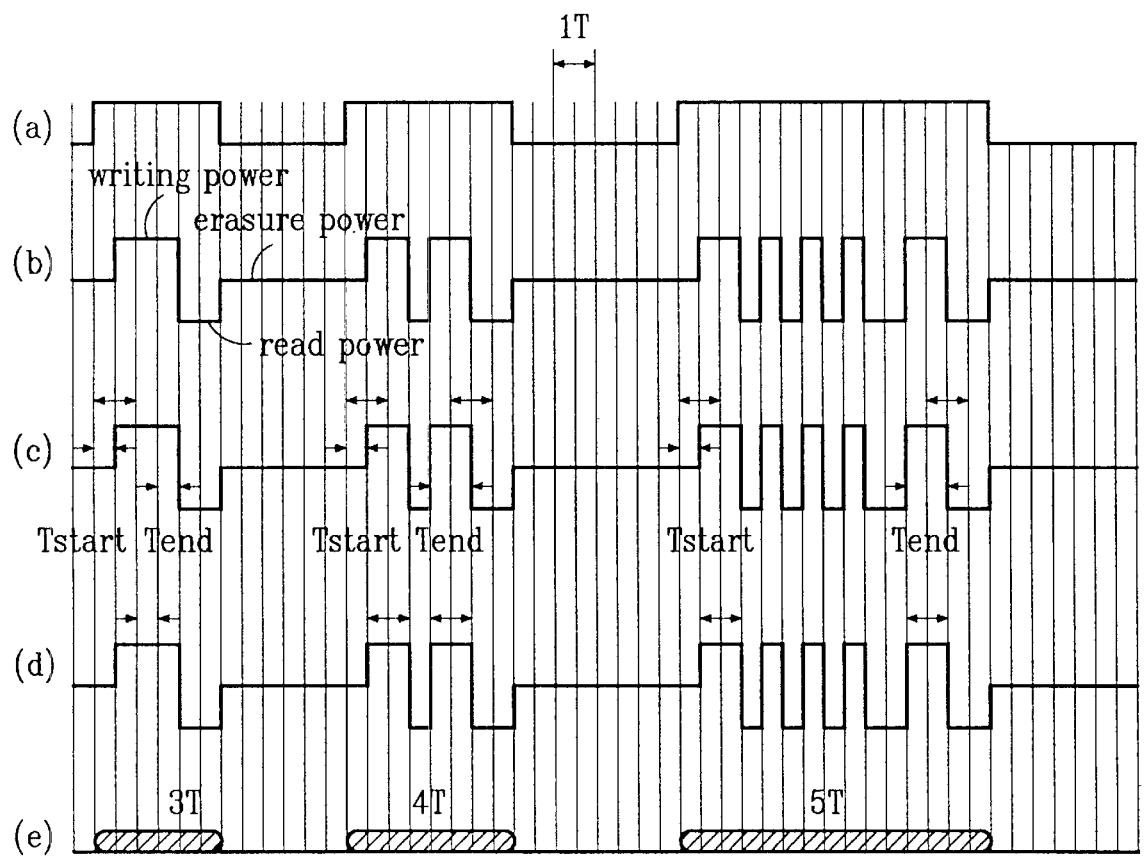
FIGS. 2A~2E illustrate timing diagrams for forming a recording mark in FIG. 1.

The writing level adder 105 sums the writing power, i.e., an LD driving voltage, generated at the writing power generator 104, a feed back voltage from the ALPC feed back 107, and the voltage generated at the fine power level generator 302, and forwards the sum to the LD driver 106. In this instance, as shown in FIG. 9G, the starting portion of the pit and the end portion of the pit become to have different power levels by the writing power compensating generator 300 of FIG. 7. As shown in FIG. 9G, the LD driver 106 drives the LD by receiving and converting an LD driving voltage into an LD driving current, for writing the writing pulse from the encoder 103 on the optical disk 101. Accordingly, an optimal recording as shown in FIG. 2E can be made even on a high density disk, such as DVD-RAM. Thus, as the present invention is applicable both to a single pulse as shown in FIG. 6G, or multi-pulse as shown in FIGS. 6H and FIG. 9G, the present invention is applicable both to read only disk, such as CD-R and DVD-R, and re-writable disk, such as CD-RW, DVD-R.

As has been explained, the device and method for generating an optimal writing signal for an optical recording medium according to the present invention permits an optimal recording, as well as optimal reproducing as there are no jitter coming from a poor recording, by fixing a writing pulse by kinds of disks and makers, and, instead, by adjusting a writing power level for a pit starting portion according to a length of a prior blank, and by adjusting a writing power level for a pit end portion according to the present pit length, thereby adjusting a width of the pit length of the mark.

It will be apparent to those skilled in the art that various modifications and variations can be made in the device and method for generating an optimal writing signal for an optical recording medium of the present invention without departing from the spirit or scope of the invention. Thus, it is intended that the present invention cover the modifications and variations of this invention provided they come within the scope of the appended claims and their equivalents.

What is claimed is:

1. A method for generating a writing signal for an optical recording medium, the method having the steps of providing a writing pulse according to a data to be written, and applying a writing power level with reference to the writing pulse to a light source to drive the light source for forming a pit, the method comprising the steps of:

(1) confirming a length of a prior blank and a length of the present pit from the writing pulse;
   (2) providing a writing power compensating signal such that a writing power level of a starting portion of the pit is determined with reference to the length of the prior blank confirmed in the step (1), and a writing power level of an end portion of the pit is determined with reference to the length of the present pit; and,
   (3) adding the provided writing power compensating signal to the writing power level.

2. A method as claimed in claim 1, wherein the step (2) includes the steps of;
   inverting the writing pulse, and
   integrating the inverted writing pulse to generate an integrated signal.

3. A method as claimed in claim 2, wherein the step (2) includes the step of subjecting the integrated signal to a non-linear transformation.

4. A method as claimed in claim 1, wherein the step (2) includes the steps of;
   charging within a blank section of the writing pulse, and
   discharging within a pit section, for providing the writing power compensating signal.

5. A method as claimed in claim 4, wherein the step (2) includes the steps of bringing an initial level of the blank portion to the reference level by charging from the reference level.

6. A method as claimed in claim 4, wherein the step (2) includes the steps of subjecting a charged/discharged signal to a non-linear transformation.

7. A method as claimed in claim 1, wherein the writing pulse is a single pulse or a multi-pulse for one pit length.

8. A method as claimed in claim 1, wherein in the step (2), said writing power level of the starting portion of the pit is different from said writing power level of the end portion of the pit.

9. A device for writing/reproducing to/from an optical recording medium, the device for forming a pit on the optical recording medium by varying a driving current for a light source according to a writing power level, the device comprising:
   an encoder for generating a writing pulse according to a data to be written;
   a writing power compensating signal generator for providing a writing power compensating signal such that a writing power level of a starting portion of the pit is determined with reference to a length of a prior blank confirmed from the writing pulse, and a writing power level of an end portion of the pit is determined with reference to a length of the pit confirmed from the writing pulse; and,
   an adder for adding the provided writing power compensating signal to the writing power level.

10. A device as claimed in claim 9, wherein the writing power compensating signal generator includes an integrator for generating the writing power compensating signal by inverting the writing pulse, and integrating the inverted writing pulse to generate an integrated signal.

11. A device as claimed in claim 10, wherein the encoder generates a reset pulse having a pit length at an initial part of a blank portion of the integrated signal, and provides the reset pulse to the integrator.

12. A device as claimed in claim 11, wherein the integrator brings an initial power of the blank portion of the integrated signal to the reference level by the reset pulse.

13. A device as claimed in claim 9, wherein the writing power compensating signal generator includes a charger/ discharger for generating the writing power compensating signal by charging within a blank section of the writing pulse and discharging within a pit section of the writing pulse.

14. A device as claimed in claim 13, wherein the encoder generates a charge switch pulse in proportion to a blank length within the blank section and a discharge switch pulse in proportion to the pit length within the pit section, and forwards the charge and discharge switch pulses to the charger/discharger.

15. A device as claimed in claim 14, wherein the charger/discharger includes;

- a charging switch for being turned on/off by the charge switch pulse,
- a discharging switch for being turned on/off by the discharge switch pulse, and
- a RC time constant for charging a charge voltage provided to the charging switch when the charging switch is turned on, and discharging the charged voltage when the discharge switch is turned on.

16. A device as claimed in claim 13, wherein the encoder generates a reset switch pulse having a pit length at a starting portion of a blank, and forwards the reset switch pulse to the charger/discharger.

17. A device as claimed in claim 16, wherein the charger/discharger further includes a reset switch adapted to be turned on/off by the reset switch pulse for ending the discharge and charging a reference voltage provided to the reset switch to an RC time constant when the reset switch is turned on.

18. A device as claimed in claim 9, wherein the writing power compensating signal generator subjects the writing power compensating signal to non-linear transformation, and forwards the transformed writing compensating signal to the adder.

19. A device as claimed in claim 9, wherein the encoder generates a single pulse as the writing pulse for one pit length.

20. A device as claimed in claim 9, wherein the encoder generates multi-pulse as the writing pulse for one pit length.

21. A device as claimed in claim 9, wherein said writing power level of the starting portion of the pit is different from said writing power level of the end portion of the pit.

* * * * *